US007436761B2

(12) United States Patent
Winter et al.

(10) Patent No.: US 7,436,761 B2
(45) Date of Patent: Oct. 14, 2008

(54) APPARATUS AND METHOD FOR CONNECTING FIBRE CHANNEL DEVICES VIA BYPASS BUFFERS

(75) Inventors: Howard William Winter, Southhampton (GB); Kenneth McPherson Hopkins, Chichester (GB)

(73) Assignee: Xyratex Technology Limited, Hampshire (GB)

( * ) Notice: Subject to any disclaimer, the term of this patent is extended or adjusted under 35 U.S.C. 154(b) by 648 days.

(21) Appl. No.: 10/522,479

(22) PCT Filed: Jul. 25, 2003

(86) PCT No.: PCT/GB03/03183

§ 371 (c)(1),
(2), (4) Date: Jan. 26, 2005

(87) PCT Pub. No.: WO2004/012399

PCT Pub. Date: Feb. 5, 2004

(65) Prior Publication Data

US 2005/0238064 A1     Oct. 27, 2005

Related U.S. Application Data

(60) Provisional application No. 60/399,151, filed on Jul. 30, 2002.

(51) Int. Cl.
*H04J 3/14*     (2006.01)
*H04J 14/00*   (2006.01)
*H04L 12/26*   (2006.01)

(52) U.S. Cl. .................. 370/217; 370/229; 370/462; 398/2

(58) Field of Classification Search ............... 370/217, 370/229, 462; 398/2
See application file for complete search history.

(56) References Cited

U.S. PATENT DOCUMENTS 5,894,481 A * 4/1999 Book ..................... 370/412
6,160,813 A * 12/2000 Banks et al. ............ 370/422
6,185,203 B1 * 2/2001 Berman .................. 370/351
6,240,096 B1   5/2001 Book (Continued)

FOREIGN PATENT DOCUMENTS

EP     0 709 986 A2     5/1996

(Continued)

OTHER PUBLICATIONS

Valentino et al., "The Incorporation of Fibre Channel and Scalable Coherent Interface Technologies in Avionics Systems, Oct. 27, 1996, pp. 365-372."

(Continued)

*Primary Examiner*—Alpus H Hsu
(74) *Attorney, Agent, or Firm*—Pillsbury Winthrop Shaw Pittman LLP

(57) ABSTRACT

Apparatus is disclosed for connecting at least a first Fibre Channel device to at least a second Fibre Channel device. The apparatus includes ports, buffers and bypass buffers that are arranged so that the second Fibre Channel device can operate at a physical link rate that is higher than the physical link rate of the first Fibre Channel device regardless of whether or not the first Fibre Channel device is sending data words to the second Fibre Channel device and regardless of whether or not the second Fibre Channel device is sending data words to the first Fibre Channel device.

30 Claims, 5 Drawing Sheets

U.S. PATENT DOCUMENTS

| | | | | |
|---|---|---|---|---|
| 6,470,007 B1 * | 10/2002 | Berman | | 370/351 |
| 6,532,212 B1 * | 3/2003 | Soloway et al. | | 370/230 |
| 6,584,101 B2 * | 6/2003 | Hagglund et al. | | 370/389 |
| 6,731,646 B1 * | 5/2004 | Banks et al. | | 370/422 |
| 6,819,654 B2 * | 11/2004 | Soloway et al. | | 370/238 |
| 6,862,293 B2 * | 3/2005 | Lay et al. | | 370/420 |
| 6,892,167 B2 * | 5/2005 | Polan et al. | | 702/187 |
| 6,904,053 B1 * | 6/2005 | Berman | | 370/466 |
| 7,012,914 B2 * | 3/2006 | Berman | | 370/351 |
| 7,301,956 B2 * | 11/2007 | Martin et al. | | 370/413 |

FOREIGN PATENT DOCUMENTS

| | | |
|---|---|---|
| EP | 0 856 969 A1 | 8/1998 |
| GB | 2 363 040 | 12/2001 |
| WO | WO 99/15973 | 4/1999 |

OTHER PUBLICATIONS

International Search Report dated Nov. 14, 2003, for Application No. PCT/GB03/03183.

* cited by examiner

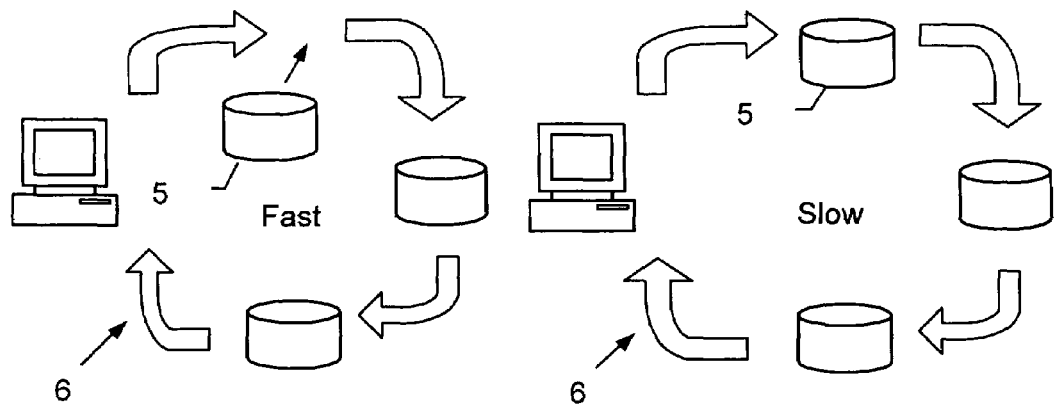
Fig. 4A
PRIOR ART
Fig. 4B
PRIOR ART
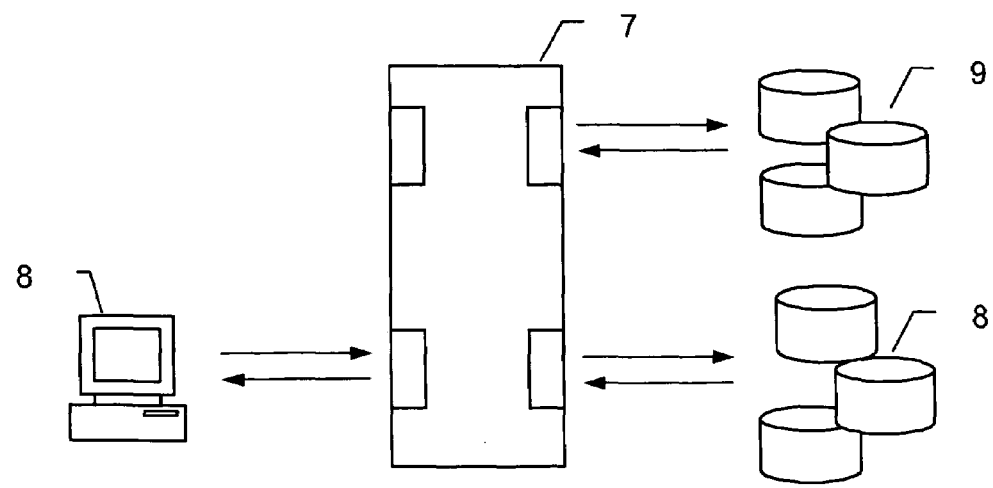
Fig. 5
PRIOR ART

APPARATUS AND METHOD FOR CONNECTING FIBRE CHANNEL DEVICES VIA BYPASS BUFFERS

CROSS REFERENCE TO RELATED APPLICATION

This is the U.S. National Stage of PCT/GB03/003183, filed Jul. 25, 2003, which in turn claims priority to U.S. Provisional Patent Application No. 60/399,151, filed Jul. 30, 2002, both of which are incorporated herein in their entirety by reference.

TECHNICAL FIELD

The present invention relates to an apparatus and method for connecting Fibre Channel devices.

BACKGROUND OF THE INVENTION

Modern Fibre Channel (FC) devices support multiple physical link speeds. Directly connecting FC devices with differing link speeds is not possible. Some multi-speed devices are able to "speed negotiate" when connected together. This allows them to find a mutually compatible link speed. In practice, this means that when a slower speed device is connected to a device (or devices) with a faster link speed, the link operates at the slower speed, even when the fast and slow devices are not communicating with each other. Not all multi-speed devices are able to automatically speed negotiate. Some require user action to manually select link speeds.

Prior art exists in the area of Fibre Channel "Fabrics" and their construction. Fabrics with ports capable of multiple link speeds do allow a slower link rate device or local loop of slower link rate devices to communicate with a faster link rate device or local loop of faster link rate devices by utilising one Fabric port for each device or local loop of devices. However, Fabrics are complex and expensive devices. An example of a Fibre Channel Fabric is disclosed in U.S. Pat. No. 6,205,145.

The following documents concern Fibre Channel Arbitrated Loop topologies (which will be discussed further below) and may provide useful background reading.

U.S. Pat. No. 5,978,379 and U.S. Pat. No. 6,243,386 each disclose the splitting of a loop of devices into two sub-loops in order to improve performance by allowing simultaneous conversations on each half of the loop (bearing in mind that normal loop operation only allows one conversation at any time, resulting in shared bandwidth). The locations of devices on each half of the loop is learnt in real time, i.e. as transfers are initiated.

U.S. Pat. No. 6,324,181 again discloses the concept of splitting a loop into a multiple sub-loops in order to improve performance. In place of the "learning" method used in U.S. Pat. No. 5,978,379 and U.S. Pat. No. 6,243,386, the system disclosed in U.S. Pat. No. 6,324,181 takes control of the loop initialisation process and allocates the AL_PA or loop ids itself. It is noted that this precludes connection to a Fabric, or other device that requires being a "loop master", as the system in U.S. Pat. No. 6,324,181 must be the loop master itself in order to allocate the loop ids.

U.S. Pat. No. 6,314,488 and WO-A-02/33561 disclose further examples of the concept of splitting a loop into multiple sub-loops.

U.S. Pat. No. 6,118,776 discloses a method and apparatus for allowing loop devices to communicate through a Fabric despite not being able to log in directly with the Fabric.

GB-A-2363040 discloses a method for link speed negotiation in a Fibre Channel Arbitrated Loop.

BRIEF SUMMARY OF THE INVENTION

According to a first aspect of the present invention, there is provided apparatus for connecting at least a first Fibre Channel device that is capable of operating at a first physical link rate to at least a second Fibre Channel device that is capable of operating at a second physical link rate that is higher than said first physical link rate, the apparatus comprising:

a first port to which at least a first Fibre Channel device operating at a first physical link rate can be connected;

a second port to which at least a second Fibre Channel device operating at a second physical link rate can be connected;

a first buffer for storing data received at the first port from a said first Fibre Channel device and forwarding said data to the second port for transmission to a said second Fibre Channel device when a said first Fibre Channel device wishes to send said data to a said second Fibre Channel device;

a second buffer for storing data received at the second port from a said second Fibre Channel device and forwarding said data to the first port for transmission to a said first Fibre Channel device when a said second Fibre Channel device wishes to send said data to a said first Fibre Channel device;

a first bypass buffer for storing data received at the first port from a said first Fibre Channel device and causing said data to be returned to the first port when a said first Fibre Channel device wishes to send said data to another Fibre Channel device connected to the first port; and, a second bypass buffer for storing data received at the second port from a said second Fibre Channel device and causing said data to be returned to the second port when a said second Fibre Channel device wishes to send said data to another Fibre Channel device connected to the second port;

whereby a said second Fibre Channel device can operate at said second physical link rate which is higher than said first physical link rate of a said first Fibre Channel device regardless of whether or not a said first Fibre Channel device is sending data words to a said second Fibre Channel device and regardless of whether or not a said second Fibre Channel device is sending data words to a said first Fibre Channel device.

The present invention enables a slower speed device or devices to be connected to faster speed device or devices, without forcing the higher speed devices to operate at the lower speed when communicating with each other. The preferred embodiment also allows devices not capable of either the same speed or automatic speed negotiation to be connected together. This can be achieved in a manner that is transparent to the devices involved.

The present invention is most useful in an Arbitrated Loop topology as it allows a mixture of devices with differing or incompatible link speeds to communicate at the best possible link speed.

In practice, it is likely that in most implementations, plural Fibre Channel devices will be connected to each other in a first loop that is connected to the first port and plural Fibre Channel devices will be connected to each other in a second loop that is connected to the second port.

In an embodiment, the apparatus comprises a storage region for storing an Arbitrated Loop Physical Address (AL_PA) look-up table in which the Arbitrated Loop Physical Addresses (AL_PAs) of all devices connected to said first and second ports are saved. The first and second ports are preferably arranged to recognise LISM, LIFA, LIPA, LIHA and LISA frames. The first and second ports are preferably arranged to compare the AL_PA bit maps of LIFA, LIPA, LIHA and LISA frames received at the first and second ports in order to identify which AL_PAs have been assigned to devices connected to the first and second ports and to pass a result of said comparison to the storage region so that the AL_PAs of all devices connected to said first and second ports can be saved in the AL_PA look-up table. In the preferred embodiment, the location of the devices is identified during initialisation of the loop by comparing LIFA, LIPA, LIHA and LISA frames. This allows bridging decisions to be made on the first transfer, i.e. no "learn time" is required as in some prior art arrangements.

In an embodiment, the first and second ports are arranged to send at least some Fill words received at the first port to the second port and to send at least some Fill words received at the second port to the first port, regardless of whether or not a said second Fibre Channel device is sending data words to a said first Fibre Channel device and regardless of whether or not a said first Fibre Channel device is sending data words to a said second Fibre Channel device.

In an embodiment, the first and second ports are arranged to send at least some ARB words received at the first port to the second port and to send at least some ARB words received at the second port to the first port, regardless of whether or not a said second Fibre Channel device is sending data words to a said first Fibre Channel device and regardless of whether or not a said first Fibre Channel device is sending data words to a said second Fibre Channel device.

In an embodiment, the first and second ports and the first and second bypass buffers are arranged such that, when non-identical ARB words are received at the first and second ports, arbitration between said non-identical ARB words is carried out and the winning ARB word of the arbitration process is returned to the port at which it was received.

In an embodiment, the first and second ports are arranged such that at least some Primitive Sequences received at the first port are sent to the second port and such that at least some Primitive Sequences received at the second port are sent to the first port, regardless of whether or not a said second Fibre Channel device is sending data words to a said first Fibre Channel device and regardless of whether or not a said first Fibre Channel device is sending data words to a said second Fibre Channel device.

In an embodiment, the first buffer is arranged such that, when a said first Fibre Channel device wishes to send data words to a said second Fibre Channel device, frame data and Start of Frame and End of Frame delimiter words received at the first port from a said first Fibre Channel device are only forwarded by the first buffer to the second port when a predetermined amount of frame data has been stored in the first buffer.

In an embodiment, the second buffer is arranged such that, when a said second Fibre Channel device wishes to send data words to a said first Fibre Channel device, frame data and Start of Frame and End of Frame delimiter words received at the second port from a said second Fibre Channel device are only forwarded by the second buffer to the first port when a predetermined amount of frame data has been stored in the second buffer.

In an embodiment, the first and second bypass buffers are arranged such that, when a said first Fibre Channel device wishes to send data words to another Fibre Channel device connected to the first port, frame data and Start of Frame and End of Frame delimiter words received at the first port from a said first Fibre Channel device are returned to the first port, and such that when a said second Fibre Channel device wishes to send data words to another Fibre Channel device connected to the second port, frame data and Start of Frame and End of Frame delimiter words received at the second port from a said second Fibre Channel device are returned to the second port.

In an embodiment, the second port is arranged such that, when a said second Fibre Channel device wishes to send data words to a said first Fibre Channel device, the exact number of Non-Fill words received at the second port are forwarded to the first port. In an embodiment, the arrangement is such that if the second buffer is approaching a full state, R_RDY words received at the first port are not transmitted to the second port until the second buffer has emptied sufficiently to receive more frames from a said second Fibre Channel device.

In an embodiment, the first port is arranged such that, when a said first Fibre Channel device wishes to send data words to a said second Fibre Channel device, the exact number of Non-Fill words received at the first port are forwarded to the second port.

In an embodiment, the first and second bypass buffers are arranged such that, when a said first Fibre Channel device wishes to send data words to another Fibre Channel device connected to the first port, Non-Fill words received at the first port from a said first Fibre Channel device are returned to the first port, and such that, when a said second Fibre Channel device wishes to send data words to another Fibre Channel device connected to the second port, Non-Fill words received at the second port from a said second Fibre Channel device are returned to the second port.

According to a second aspect of the present invention, there is provided a method of operating apparatus that connects at least a first Fibre Channel device that is capable of operating at a first physical link rate to at least a second Fibre Channel device that is capable of operating at a second physical link rate that is higher than said first physical link rate, the apparatus having a first port to which the first Fibre Channel device capable of operating at the first physical link rate is connected, a second port to which the second Fibre Channel device capable of operating at the second physical link rate is connected, a first buffer, a second buffer, a first bypass buffer and a second bypass buffer, the method comprising:

when the first Fibre Channel device wishes to send data to the second Fibre Channel devices, storing said data received at the first port from the first Fibre Channel device in the first buffer, forwarding said data to the second port and transmitting said data from the second port to the second Fibre Channel device;

when the second Fibre Channel device wishes to send data to the first Fibre Channel device, storing said data received at the second port from the second Fibre Channel device in the second buffer, forwarding said data to the first port and transmitting said data from the first port to the first Fibre Channel device;

when the first Fibre Channel device wishes to send data to another Fibre Channel device connected to the first port, storing said data received at the first port from the first Fibre Channel device in the first bypass buffer and causing said data to be returned to the first port; and, when the second Fibre Channel device wishes to send data to another first Fibre Channel device connected to the second port, storing said data received at the second port from the second Fibre Channel device in the second bypass buffer and causing said data to be returned to the second port;

whereby the second Fibre Channel device operates at the second physical link rate which is higher than the first physical link rate of the first Fibre Channel device regardless of whether or not the first Fibre Channel device is sending data words to the second Fibre Channel device and regardless of whether or not the second Fibre Channel device is sending data words to the first Fibre Channel device.

In an embodiment, the method comprises saving the Arbitrated Loop Physical Addresses (AL_PAs) of all devices connected to said first and second ports in an Arbitrated Loop Physical Address (AL_PA) look-up table. The first and second ports preferably recognise LISM, LIFA, LIPA, LIHA and LISA frames. In an embodiment, the first and second ports compare the AL_PA bit maps of LIFA, LIPA, LIHA and LISA frames received at the first and second ports in order to identify which AL_PAs have been assigned to devices connected to the first and second ports and pass a result of said comparison to the look-up table so that the AL_PAs of all devices connected to said first and second ports are saved in the AL_PA look-up table.

In an embodiment, the first and second ports send at least some Fill words received at the first port to the second port and send at least some Fill words received at the second port to the first port, regardless of whether or not the second Fibre Channel device is sending data words to the first Fibre Channel device and regardless of whether or not the first Fibre Channel device is sending data words to the second Fibre Channel device.

In an embodiment, the first and second ports send at least some ARB words received at the first port to the second port and send at least some ARB words received at the second port to the first port, regardless of whether or not the second Fibre Channel device is sending data words to the first Fibre Channel device and regardless of whether or not the first Fibre Channel device is sending data words to the second Fibre Channel device.

In an embodiment, when non-identical ARB words are received at the first and second ports, arbitration between said non-identical ARB words is carried out and the winning ARB word of the arbitration process is returned to the port at which it was received.

In an embodiment, at least some Primitive Sequences received at the first port are sent to the second port and at least some Primitive Sequences received at the second port are sent to the first port, regardless of whether or not the second Fibre Channel device is sending data words to the first Fibre Channel device and regardless of whether or not the first Fibre Channel device is sending data words to the second Fibre Channel device.

In an embodiment, when the first Fibre Channel device wishes to send data words to the second Fibre Channel device, frame data and Start of Frame and End of Frame delimiter words received at the first port from the first Fibre Channel device are only forwarded by the first buffer to the second port when a predetermined amount of frame data has been stored in the first buffer.

In an embodiment, when the second Fibre Channel device wishes to send data words to the first Fibre Channel device, frame data and Start of Frame and End of Frame delimiter words received at the second port from the second Fibre Channel device are only forwarded by the second buffer to the first port when a predetermined amount of frame data has been stored in the second buffer.

In an embodiment, when the first Fibre Channel device wishes to send data words to another Fibre Channel device connected to the first port, frame data and Start of Frame and End of Frame delimiter words received at the first port from the first Fibre Channel device are returned to the first port, and when the second Fibre Channel device wishes to send data words to another Fibre Channel device connected to the second port, frame data and Start of Frame and End of Frame delimiter words received at the second port from the second Fibre Channel device are returned to the second port.

In an embodiment, when the second Fibre Channel devices wishes to send data words to the first Fibre Channel device, the exact number of Non-Fill words received at the second port are forwarded to the first port. In an embodiment, if the second buffer is approaching a full state, R_RDY words received at the first port are not transmitted to the second port until the second buffer has emptied sufficiently to receive more frames from the second Fibre Channel device.

In an embodiment, when the first Fibre Channel devices wishes to send data words to the second Fibre Channel device, the exact number of Non-Fill words received at the first port are forwarded to the second port.

In an embodiment, when the first Fibre Channel devices wishes to send data words to another Fibre Channel device connected to the first port, Non-Fill words received at the first port from the first Fibre Channel device are returned to the first port, and, when the second Fibre Channel device wishes to send data words to another Fibre Channel device connected to the second port, Non-Fill words received at the second port from the second Fibre Channel device are returned to the second port.

BRIEF DESCRIPTION OF THE DRAWINGS

Embodiments of the present invention will now be described by way of example with reference to the accompanying drawings, in which:

FIGS. 4A and 4B show schematically the effect of adding a slower link speed device to a loop of faster link devices in the prior art;

FIG. 5 shows schematically the connection of slower link speed Fibre Channel devices to faster link speed Fibre Channel devices using multiple ports of a multi rate Fabric in the prior art;

DETAILED DESCRIPTION

Figure 1:
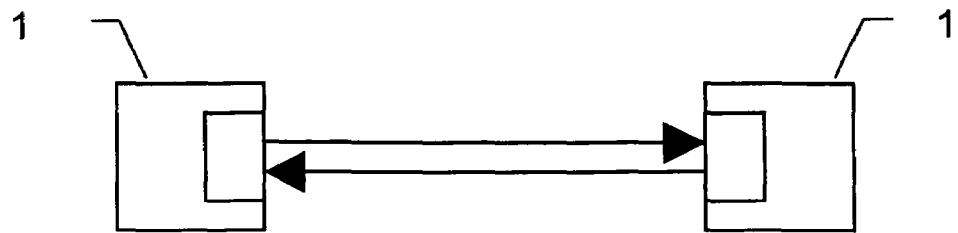
FIG. 1 is a schematic representation of a Fibre Channel point-to-point topology.

Fibre Channel defines three topologies, namely Point-to-Point, Arbitrated Loop, and Fabric. Each of these is described below:

(i) Point-to-Point topology, shown schematically in FIG. 1, is the simplest of the three. It consists of two and only two Fibre Channel devices 1 connected directly together. The transmit fibre of one device 1 goes to the receive fibre of the other device 1 and vice versa. There is no sharing of the media, which allows the devices 1 to enjoy the total bandwidth of the link. A simple link initialisation is required of the two devices 1 before communication can begin.

Figure 2:
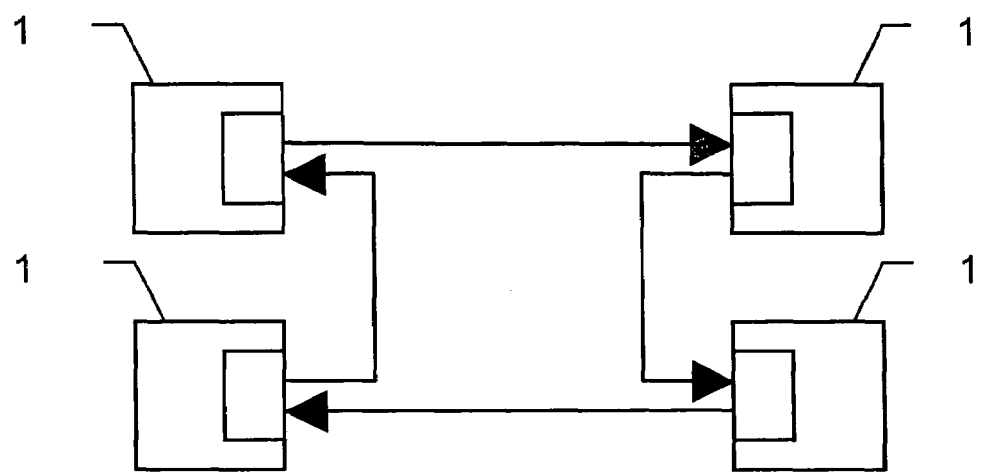
FIG. 2 is a schematic representation of a Fibre Channel Arbitrated Loop topology.

(ii) Arbitrated Loop, shown schematically in FIG. 2, is a cost-effective way of connecting up to 127 ports in a single network without the need of a Fabric switch. Unlike the other two topologies, the media is shared among the devices 1, limiting each device's access. Not all devices are required to operate on an Arbitrated Loop; the added functionality is optional. For a Loop to operate, all devices must be loop devices.

Figure 3:
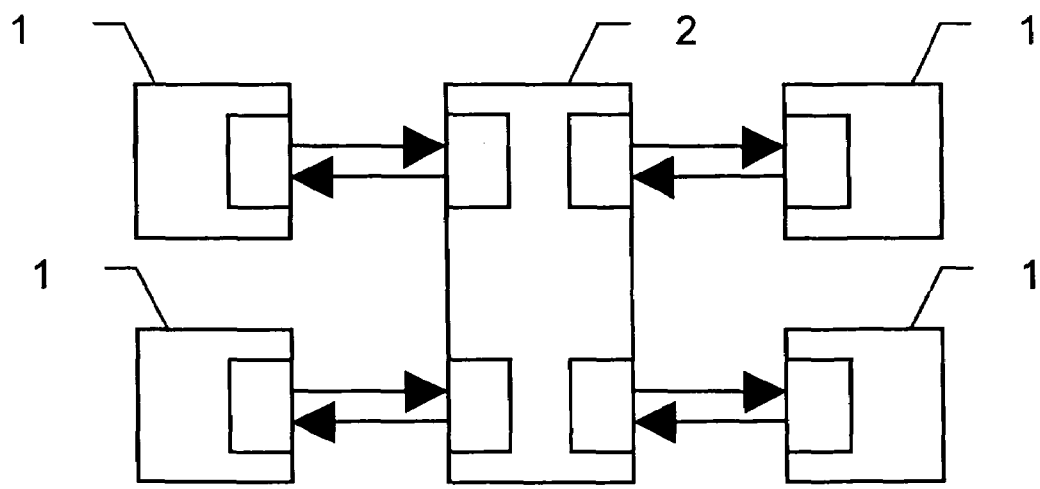
FIG. 3 is a schematic representation of a Fibre Channel Fabric topology.

(iii) The Fabric topology, shown schematically in FIG. 3, is used to connect many devices 1 in a cross-point switched configuration. The benefit of this topology is that many devices can communicate at the same time; the media is not shared. Fibre Channel Fabrics are complex devices.

As this invention is primarily concerned with Arbitrated Loop topology its protocol is outlined in more detail below.

Before a Loop is usable, it must be initialised such that each port obtains an Arbitrated Loop Physical Address (AL_PA). The process of Loop initialisation is as follows:

(i) A LIP (Loop Initialisation Primitive) Sequence is transmitted by the port after it powers on, or when it detects Loop Failure. The LIP will propagate around the Loop, triggering all other ports to transmit LIPs as well. At this point, the Loop is not usable.

(ii) A Loop master is selected that will control the process of AL_PA (Arbitrated Loop Physical Address) selection. This is done by the ports constantly transmitting Loop Initialisation Select Master (LISM) frames. The process is designed so that if a Fabric is present, it will become Loop master (by receiving back its own LISM frames), otherwise, the port with the numerically lowest Port Name will win. All other ports propagate higher priority LISM frames.

(iii) Ports select or are allocated an AL_PA. The concept of an AL_PA bitmap is used, where each port selects (and sets) a single bit in the bitmap of a frame originated by the Loop master and repeats the frame back on the Loop. There are 127 available bits, corresponding to the 127 valid AL_PAs. This process is done using four frames, breaking the selection down according to the priority shown below:

LIFA—Loop Initialisation Fabric Assigned
A certain AL_PA was assigned by a Fabric (if present).
LIPA—Loop Initialisation Previously Acquired
Before this initialisation the port had a valid AL_PA.
LIHA—Loop Initialisation Hard Assigned
The port has a certain hard-coded AL_PA which it tries to claim.
LISA—Loop Initialisation Soft Assigned
The port claims the first available AL_PA that remains.
Once the LISA frame has come back to the Loop master, all ports should have an AL_PA.

(iv) Finally, the Loop master transmits the CLS (Close) Primitive Signal to let each port know that the process has finished. At this point, the Loop has finished initialising and is ready to be used.

When a loop device is ready to transmit data, it first must arbitrate and gain control of the Loop. It does this by transmitting the Arbitrate (ARBx) Primitive Signal, where x=the Arbitrated Loop Physical Address (AL_PA) of the device. Once a device receives its own ARBx Primitive Signal, it has gained control of the Loop and can now communicate with other devices by transmitting an Open (OPN) Primitive Signal to a destination device. Once this happens, communication between the two devices is possible. All other loop devices simply repeat the data.

If more than one device on the Loop is arbitrating at the same time, the x values of the ARB Primitive Signals are compared. When an arbitrating device receives another device's ARBx, the ARBx with the numerically lower AL_PA is forwarded, while the ARBx with the numerically higher AL_PA is blocked. Thus, the device with the lower AL_PA will gain control of the Loop first. Once that device relinquishes control of the Loop, the other device can have a chance.

There is no limit on how long a device may retain control of the Loop. There is, however, an optional Access Fairness Algorithm, which prohibits a device from arbitrating again until all other devices have had a chance to arbitrate.

All information in Fibre Channel is transmitted in groups of four Transmission Characters called Transmission Words. Some Transmission Words have K28.5 as the first Transmission Character. These are special Transmission Characters called Ordered Sets. Some Ordered Sets mark the beginning and end of frames (frame delimiters). Others convey information in between frames in the form of Primitive Signals (a single Ordered Set) and Primitive Sequences (a stream of the same Ordered Set). Examples of Ordered Sets are: Start of Frame (SOF), End of Frame (EOF), Idle, Receiver_Ready (R_RDY), Loop Initialisation Primitive (LIP), Arbitrate (ARB), Open (OPN), Close (CLS), and several others.

Further background information on Fibre Channel can be obtained from www.fibrechannel.com and www.iol.unh.edu/training/fc/fc_tutorial.html.

FIGS. 4A and 4B demonstrate schematically what happens when a slower link speed device 5, such as a disk drive 5, is added to a loop 6 of faster link devices. After re-initialisation, the loop 6 operates at the lower link speed and performance is potentially lost.

The existing technique for connecting slower link speed Fibre Channel devices to faster ones utilises multiple ports of a multi rate Fabric as shown schematically in FIG. 5. A full multi-link speed Fabric 7 allows the faster link speed disk drives or other devices 8 to communicate at their best possible rate whilst still providing access to the slower devices 9. However, this has the following drawbacks. First, FC Fabrics are complex and relatively expensive. Secondly, at least one of the Fabric's ports is required to operate at the slower link rate. This means the Fabric is potentially being under utilised. Thirdly, a Fabric has the potential to add significant latency to the data transactions between devices. Last, devices connected to a Fabric are required to "login" and communicate with the Fabric. This adds complexity and may prevent some loop devices from working if they are unable to login directly to a Fabric.

Figure 6:
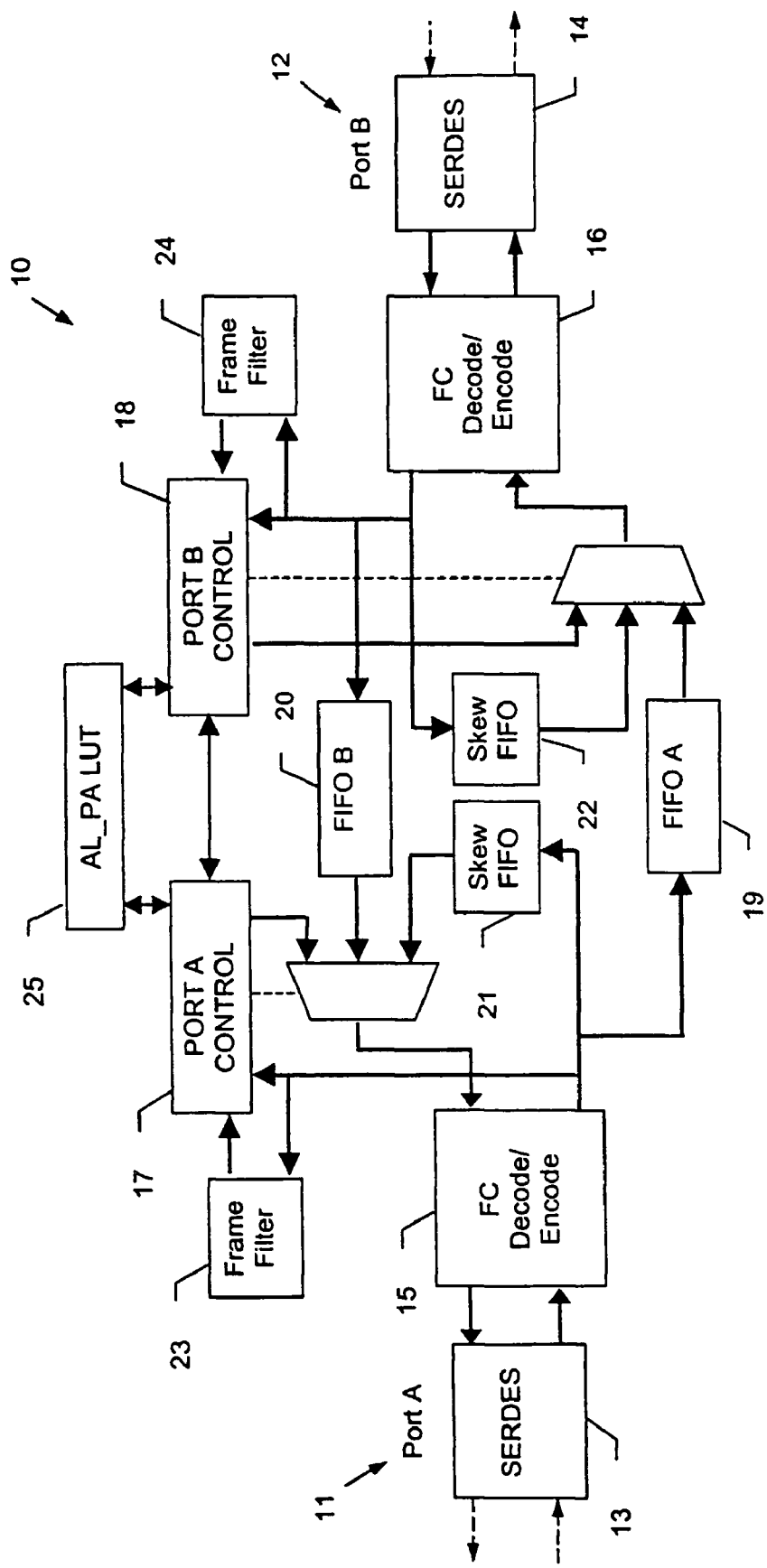
FIG. 6 is a block diagram of an example of an embodiment of apparatus according to the present invention.

Referring now to FIG. 6, there is shown a block diagram of an example of an embodiment of apparatus 10 according to the present invention. The example of the apparatus 10 shown is for connecting a first Fibre Channel device or loop of first Fibre Channel devices (not shown in FIG. 6) via a first Port A 11 to a second Fibre Channel device or loop of second Fibre Channel devices (not shown in FIG. 6) via a second Port B 12. Hereinafter, for simplicity it will be assumed that a loop of first Fibre Channel devices is connected via Port A 11 and that a loop of second Fibre Channel devices is connected via Port B 12; it will understood however that a single Fibre Channel device may be connected to one or both of Ports A and B 11,12. Moreover, additional Ports and appropriate circuitry may be provided to support connection of further Fibre Channel devices or loops of Fibre Channel devices, operating at the same or different physical link rate as other Fibre Channel devices connected via the apparatus 10, to be connected via the apparatus 10.

In the following description, it is assumed that the first loop of Fibre Channel devices is capable of operating at a first physical link rate and that the second loop of Fibre Channel devices is capable of operating at a second physical link rate that is higher than the first physical link rate.

The apparatus 10 has the following functional blocks: SERDES 13,14 (serial-to-parallel and parallel-to-serial converter); Fibre Channel transmission word decoder/encoders 15,16; port control logic 17,18; internal buffers 19,20,21,22, which are preferably FIFOs ("first in—first out"); LISM, LIFA, LIPA, etc. . . . Frame Filters 23,24; and, an AL_PA Look Up Table (LUT) 25. These functional blocks will now be briefly described.

Each SERDES 13,14 serialises and de-serialises Fibre Channel data to and from parallel data buses.

Each Fibre Channel transmission word decoder/encoder 15,16 decodes and encodes raw Fibre Channel data. Each Fibre Channel transmission word decoder/encoder 15,16 also decodes and encodes the various Ordered Sets, Primitives, Primitive Sequences and Fill Words as defined in the Fibre Channel standard.

The port control logic 17,18 control operation of the apparatus 10. They condition the flow of data to and from the FIFOs 19,20,21,22, transmission word decoder/encoders 15,16, and frame filters 23,24, in response to received Fibre Channel transmission words.

The FIFOs 19,20,21,22 hold data temporarily.

FIFOs A and B 19,20 are used to hold words being transferred between Ports A and B 11,12. FIFO A 19 is sized to hold a minimum of one full sized Fibre Channel frame. FIFO B 20 is sized to hold a larger number of frames; this is required because a higher link speed device could potentially send an initial burst of frames after winning arbitration.

Skew FIFOs 21,22 are used to bypass ports when only local devices are communicating on one or both of the loops. This allows the Port B loop to operate at its higher rate when higher rate devices are transferring data.

The AL_PA LUT ("look-up table") 25 is used to store the AL_PAs (loop ids) for devices on the two Ports A and B 11,12. The AL_PA LUT 25 is used to control when the skew FIFOs 21,22 are required.

The frame filters 23,24 are used to identify LIFA, LIPA, LIHA and LISA frames for use in populating the AL_PA look-up table 25. The frame filters 23,24 are also used to identify LISM frames during initialisation.

An example of a preferred operation of the apparatus 10 will now be described.

First, loop initialisation is carried out. During loop initialisation, LISM frames are sent continuously until a loop master is established. To avoid LISM frames received on Port B 12 overflowing FIFO B 20, only one LISM frame at a time is stored in FIFO B 20 (remembering that in this example Port B 20 is operating at a higher link speed than Port A 19). As LIFA, LIPA, LIHA and LISA frames are received on Ports A and B 19,20, the AL_PA bit maps they contain are compared. The difference between the AL_PA bit maps identifies which AL_PAs have been assigned to devices on each of Ports A and B 19,20. This information is passed to the AL_PA LUT 25, which maintains a list of AL_PAs assigned to each of Ports A and B 19,20. Thus, the apparatus 10 identifies the location of the devices during initialisation of the loop by comparing LIFA, LIPA, LIHA and LISA frames. This method allows bridging decisions to be made on the first transfer, i.e. no "learn time" is required as in some prior art arrangements.

During loop initialisation, the skew FIFOs 21,22 are inactive and words received by each of Ports A and B 19,20 are forwarded to the other. This ensures that all devices are involved in the initialisation process.

Once initialisation is complete (i.e. the loop master sends a CLS), the skew FIFOs 21,22 are enabled. The skew FIFOs 21,22 now provide Port A and B 11,12 bypass paths, performing the required skew management as per normal Fibre Channel requirements.

The skew FIFOs 21,22 remain active until one of two conditions is met:

(i) Port B 12 receives an OPN indicating a device on port B 12 has won arbitration and wishes to send data to a device on Port A 11. The AL_PA LUT 25 is used to verify the AL_PA; or:

(ii) Port A 11 receives an OPN indicating a device on port A 11 has won arbitration and wishes to send data to a device on Port B 12.

The skew FIFOs 21,22 will at this point go inactive and Port A devices are now included in the Port B loop. The skew FIFOs 21,22 remain inactive until one of two conditions is met:

(i) Port A 11 receives a CLS (if Port B 12 received the OPN); or:

(ii) Port B 12 received a CLS (if Port A 11 received the OPN).

The main function of the apparatus 10 is to forward Fibre Channel transmission words received from Port A 11 to Port B 12 and vice versa in an appropriate way. Fibre Channel transmission words are arranged in a number of categories: Data Words, Fill Words, Non-Fill Words, Primitive Sequences and Frame Delimiters. Those skilled in the art will be familiar with these categories and their use within the Fibre Channel protocol. When transferring transmission words from Port A 11 to Port B 12 (and vice versa), the category of transmission word affects its handling within the apparatus 10, as will now be described.

Fill Words (IDLE and ARB) are used primarily when no other words are being sent over the link. They are also used between Frames and other Non-Fill words. When Port A 11 is required to send a Fill Word, it uses the last received Fill Word received from Port B 12, and vice versa. Nominally, the exact number of Fill Words received on Port B 12 need not be sent on Port A 11, and vice versa. (In a preferred embodiment, during arbitration, the fairness window is reset by the transmission of at least two IDLE primitives. To ensure correct operation, a minimum of two IDLE primitives is sent on Port A 11 when two IDLE primitives are received after ARB primitives on Port B 12, and vice versa.)

ARB words being received at either of Ports A and B 11,12 are nominally forwarded to the other Port 11,12 to ensure that arbitration includes devices on both loops even when the skew FIFOs 21,22 are active. When non-identical ARB words are being received by both Ports 11,12, the normal Fibre Channel priority rules are applied and the winning ARB is not forwarded but returned to the originating Port 11,12. This provides some acceleration of the arbitration process as the ARB is no longer forced to travel around the whole loop.

Primitive Sequences (such as NOS,OLS,LR,LRR,LIP, LPB & LPE) are sometimes sent to control protocol and are valid when three consecutive words are received. Port A 11 sends the same Primitive Sequence received from Port B 12, and vice versa. Nominally, the exact number of Primitive Sequence words received on Port B 12 need not be sent on Port A 11, and vice versa. However, a minimum of three words for any given received sequence is always sent. (In a preferred embodiment, during the Loop initialisation process, devices are required to send a minimum of twelve LIP Primitives. When twelve LIP Primitives are received at Port A 11, a minimum of twelve are sent by Port B 12, and vice versa.) Primitive Sequences are always transferred from Port A 11 to Port B 12, and vice versa, even when the respective Port A or Port B skew FIFO 21,22 is active. This ensures that the Port A and Port B devices remain an active part of any loop control process.

Frame Data and Delimiter Words (SOF & EOF) are sent to mark the start and end of frames and the data within them. If the skew FIFOs 21,22 are inactive, then Port A 11 sends SOF, EOF or Frame Data Words as received via Port B 12, and vice versa. Ports A and B 11,12 only forward on SOF, EOF and Frame Data once a key amount of the frame has been received and is present in the respective FIFO 19,20. The exact amount of frame data required in the FIFO 19,20 relates to the respective link speeds of Ports A and B 11,12. If the Port B skew FIFO 22 is active, then frames received on Port B 12 are looped back to Port B 12 and not forwarded to Port A 11, and vice versa.

With respect to Non-Fill Words (such as R_RDY,CLS, OPN & DHD), if the Port B skew FIFO 22 is inactive, then Port A 11 sends the exact number of these words as received by Port B 12, and vice versa. If FIFO B 20 is approaching a full state, R_RDYs received from Port A 11 are held back from being forwarded onto Port B 12 until FIFO B 20 is at a low enough level to accept more frames. This can happen in situations where the higher rate device has a high buffer credit. If the Port B skew FIFO 22 is active, then Non-Fill Words received on Port B 12 are looped back to Port B 12 and not forwarded to Port A 11.

Ports A and B 11,12 ensure they maintain the minimum Fill Word requirements between frames and Non-Fill Words at all times.

In practice, all or some of the functional blocks described above may be implemented in one or more ASICs or in one or more programmable logic devices, such as FPGAs. In one preferred embodiment, the word decoder/encoders 15,16, the port control logic 17,18, the internal buffers 19,20,21,22, the Frame Filters 23,24, and the AL_PA Look Up Table (LUT) 25 are all implemented in a single FPGA or a single ASIC; the SERDES 13,14 may be implemented in the same FPGA or ASIC or may be provided separately.

Figure 7:
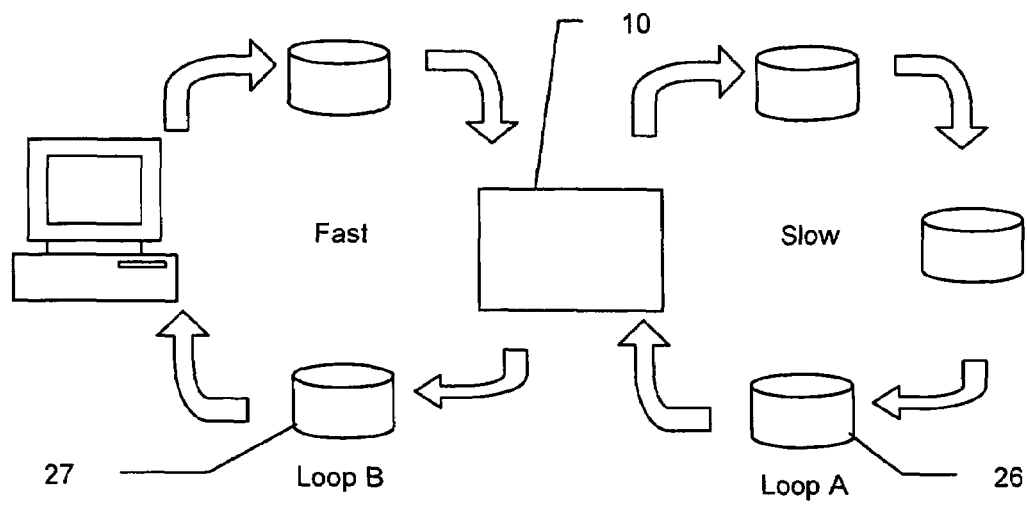
FIG. 7 shows schematically a first example of the use of an embodiment of the present invention.

As shown schematically in FIG. 7, the preferred embodiment of the present invention enables a slower speed device or devices 26 to be connected to faster speed device or devices 27, without forcing the higher speed devices to operate at the lower speed when communicating with each other and without requiring use of a Fabric. The slower link speed disk drives are available without limiting the faster link rate portion of the loop. Link rate conversion is provided in a manner that is transparent to the devices involved and with minimal latency. Devices not capable of either the same speed or automatic speed negotiation can be connected together. This can be achieved in a manner that is transparent to the devices involved. Link rate conversion can be provided between links of any arbitrary rate (i.e. no special harmonic relationship is required). Fibre Channel devices incapable of the same link rate can be connected together. The apparatus is not required to be a "loop master". This means that a Fabric or other device that requires being a loop master can still be connected if desired. The apparatus can provide intelligent bypassing.

Figure 8:
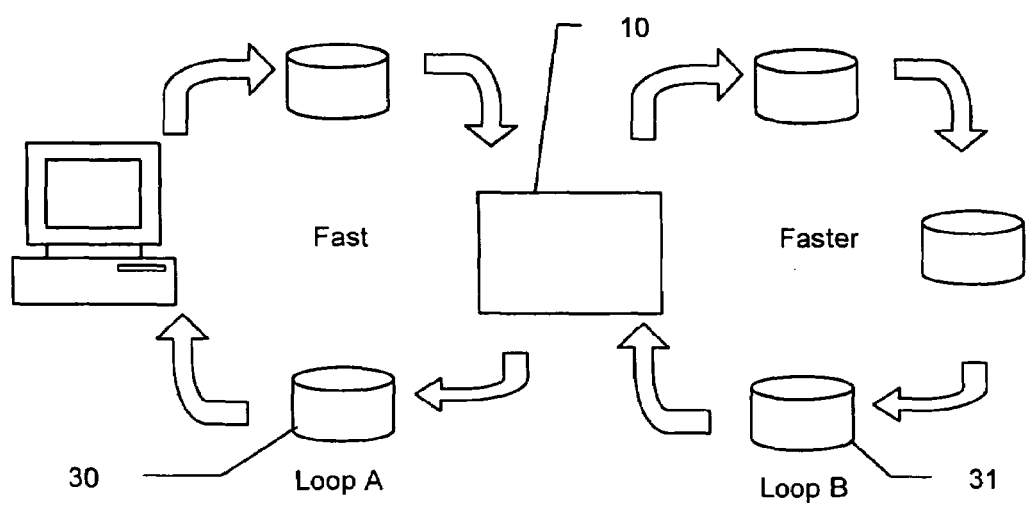
FIG. 8 shows schematically a second example of the use of an embodiment of the present invention; and, FIG. 9 shows schematically a third example of the use of an embodiment of the present invention.

As indicated schematically in FIG. 8, the apparatus 10 can be used to allow currently available link speed devices 30 to communicate with newer faster link speed devices 31 as they emerge. This can help ease transitions in technology.

Figure 9:
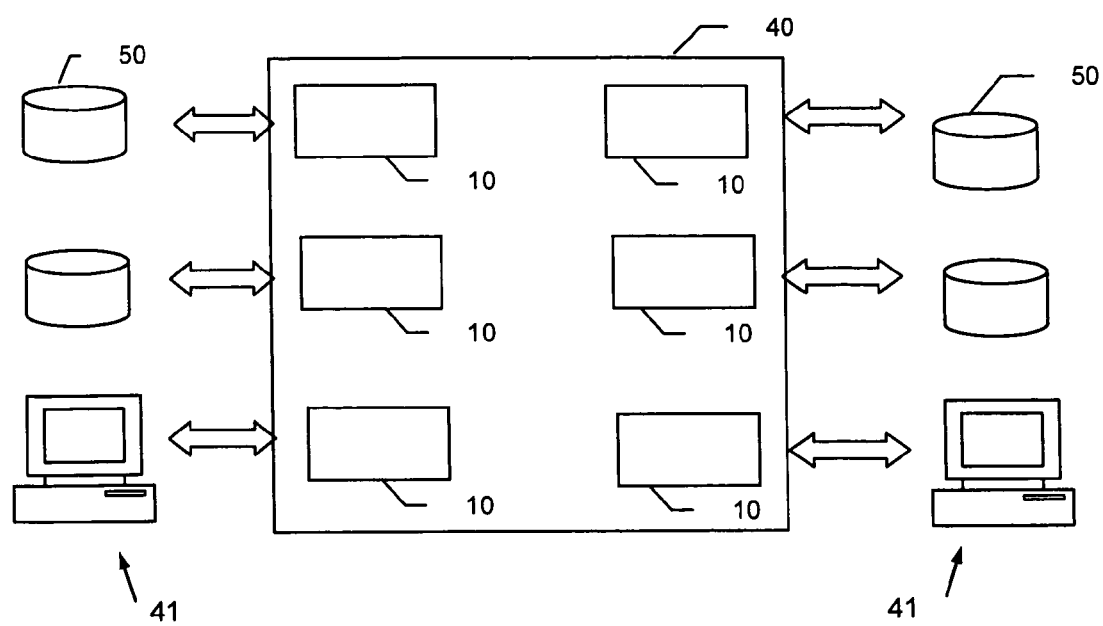

As indicated schematically in FIG. 9, the apparatus 10 can be used to form a Fibre Channel "hub" 40. By including the apparatus 10 (or an appropriate sub-set of the functional blocks of the apparatus 10) at each port of the hub 40, multiple devices 50 of differing link speed are able to communicate with each other.

Embodiments of the present invention have been described with particular reference to the examples illustrated. However, it will be appreciated that variations and modifications may be made to the examples described within the scope of the present invention.

The invention claimed is:

1. Apparatus for connecting at least a first Fibre Channel device that is capable of operating at a first physical link rate to at least a second Fibre Channel device that is capable of operating at a second physical link rate that is higher than said first physical link rate, the apparatus comprising:

a first port to which the at least a first Fibre Channel device operating at a first physical link rate can be connected;

a second port to which the at least a second Fibre Channel device operating at a second physical link rate can be connected;

a first buffer for storing data received at the first port from a said first Fibre Channel device and forwarding said data to the second port for transmission to a said second Fibre Channel device when a said first Fibre Channel device wishes to send said data to a said second Fibre Channel device;

a second buffer for storing data received at the second port from a said second Fibre Channel device and forwarding said data to the first port for transmission to a said first Fibre Channel device when a said second Fibre Channel device wishes to send said data to a said first Fibre Channel device;

a first bypass buffer for storing data received at the first port from a said first Fibre Channel device and causing said data to be returned to the first port when a said first Fibre Channel device wishes to send said data to another Fibre Channel device connected to the first port; and, a second bypass buffer for storing data received at the second port from a said second Fibre Channel device and causing said data to be returned to the second port when a said second Fibre Channel device wishes to send said data to another Fibre Channel device connected to the second port;

whereby a said second Fibre Channel device can operate at said second physical link rate which is higher than said first physical link rate of a said first Fibre Channel device regardless of whether or not a said first Fibre Channel device is sending data words to a said second Fibre Channel device and regardless of whether or not a said second Fibre Channel device is sending data words to a said first Fibre Channel device.

2. Apparatus according to claim 1, comprising a storage region for storing an Arbitrated Loop Physical Address (AL_PA) look-up table in which the Arbitrated Loop Physical Addresses (AL_PAs) of all devices connected to said first and second ports are saved.

3. Apparatus according to claim 2, wherein the first and second ports are arranged to recognise LISM (Loop Initialisation Select Master), LIFA (Loop Initialisation Fabric Assigned), LIPA (Loop Initialisation Previously Acquired), LIHA (Loop Initialisation Hard Assigned) and LISA (Loop Initialisation Soft Assigned) frames.

4. Apparatus according to claim 3, wherein the first and second ports are arranged to compare the AL_PA bit maps of LIFA, LIPA, LIHA and LISA frames received at the first and second ports in order to identify which AL_PAs have been assigned to devices connected to the first and second ports and to pass a result of said comparison to the storage region so that the AL_PAs of all devices connected to said first and second ports can be saved in the AL_PA look-up table.

5. Apparatus according to claim 1, wherein the first and second ports are arranged to send at least some Fill words received at the first port to the second port and to send at least some Fill words received at the second port to the first port, regardless of whether or not a said second Fibre Channel device is sending data words to a said first Fibre Channel device and regardless of whether or not a said first Fibre Channel device is sending data words to a said second Fibre Channel device.

6. Apparatus according to claim 1, wherein the first and second ports are arranged to send at least some ARB (Arbitrate Primitive Signal) words received at the first port to the second port and to send at least some ARB words received at the second port to the first port, regardless of whether or not a said second Fibre Channel device is sending data words to a said first Fibre Channel device and regardless of whether or not a said first Fibre Channel device is sending data words to a said second Fibre Channel device.

7. Apparatus according to claim 1, wherein the first and second ports and the first and second bypass buffers are arranged such that, when non-identical ARB (Arbitrate Primitive Signal) words are received at the first and second ports, an arbitration process between said non-identical ARB words is carried out and the winning ARB word of the arbitration process is returned to the port at which it was received.

8. Apparatus according to claim 1, wherein the first and second ports are arranged such that at least some Primitive Sequences received at the first port are sent to the second port and such that at least some Primitive Sequences received at the second port are sent to the first port, regardless of whether or not a said second Fibre Channel device is sending data words to a said first Fibre Channel device and regardless of whether or not a said first Fibre Channel device is sending data words to a said second Fibre Channel device.

9. Apparatus according to claim 1, wherein the first buffer is arranged such that, when a said first Fibre Channel device wishes to send data words to a said second Fibre Channel device, frame data and Start of Frame and End of Frame delimiter words received at the first port from a said first Fibre Channel device are only forwarded by the first buffer to the second port when a predetermined amount of frame data has been stored in the first buffer.

10. Apparatus according to claim 1, wherein the second buffer is arranged such that, when a said second Fibre Channel device wishes to send data words to a said first Fibre Channel device, frame data and Start of Frame and End of Frame delimiter words received at the second port from a said second Fibre Channel device are only forwarded by the second buffer to the first port when a predetermined amount of frame data has been stored in the second buffer.

11. Apparatus according to claim 1, wherein the first and second bypass buffers are arranged such that, when a said first Fibre Channel device wishes to send data words to another Fibre Channel device connected to the first port, frame data and Start of Frame and End of Frame delimiter words received at the first port from a said first Fibre Channel device are returned to the first port, and such that when a said second Fibre Channel device wishes to send data words to another Fibre Channel device connected to the second port, frame data and Start of Frame and End of Frame delimiter words received at the second port from a said second Fibre Channel device are returned to the second port.

12. Apparatus according to claim 1, wherein the second port is arranged such that, when a said second Fibre Channel device wishes to send data words to a said first Fibre Channel device, the exact number of Non-Fill words received at the second port are forwarded to the first port.

13. Apparatus according to claim 12, wherein the arrangement is such that if the second buffer is approaching a full state R_RDY (Receiver_Ready) words received at the first port are not transmitted to the second port until the second buffer has emptied sufficiently to receive more frames from a said second Fibre Channel device.

14. Apparatus according to claim 1, wherein the first port is arranged such that, when a said first Fibre Channel device wishes to send data words to a said second Fibre Channel device, the exact number of Non-Fill words received at the first port are forwarded to the second port.

15. Apparatus according to claim 1, wherein the first and second bypass buffers are arranged such that, when a said first Fibre Channel device wishes to send data words to another Fibre Channel device connected to the first port, Non-Fill words received at the first port from a said first Fibre Channel device are returned to the first port, and such that, when a said second Fibre Channel device wishes to send data words to another Fibre Channel device connected to the second port, Non-Fill words received at the second port from a said second Fibre Channel device are returned to the second port.

16. A method of operating apparatus that connects at least a first Fibre Channel device that is capable of operating at a first physical link rate to at least a second Fibre Channel device that is capable of operating at a second physical link rate that is higher than said first physical link rate, the apparatus having a first port to which the first Fibre Channel device capable of operating at the first physical link rate is connected, a second port to which the second Fibre Channel device capable of operating at the second physical link rate is connected, a first buffer, a second buffer, a first bypass buffer and a second bypass buffer, the method comprising:
    when the first Fibre Channel device wishes to send data to the second Fibre Channel devices, storing said data received at the first port from the first Fibre Channel device in the first buffer, forwarding said data to the second port and transmitting said data from the second port to the second Fibre Channel device;
    when the second Fibre Channel device wishes to send data to the first Fibre Channel device, storing said data received at the second port from the second Fibre Channel device in the second buffer, forwarding said data to the first port and transmitting said data from the first port to the first Fibre Channel device;
    when the first Fibre Channel device wishes to send data to another Fibre Channel device connected to the first port, storing said data received at the first port from the first Fibre Channel device in the first bypass buffer and causing said data to be returned to the first port; and,
    when the second Fibre Channel device wishes to send data to another first Fibre Channel device connected to the second port, storing said data received at the second port from the second Fibre Channel device in the second bypass buffer and causing said data to be returned to the second port;
    whereby the second Fibre Channel device operates at the second physical link rate which is higher than the first physical link rate of the first Fibre Channel device regardless of whether or not the first Fibre Channel device is sending data words to the second Fibre Channel device and regardless of whether or not the second Fibre Channel device is sending data words to the first Fibre Channel device.

17. A method according to claim 16, comprising saving the Arbitrated Loop Physical Addresses (AL_PAs) of all devices connected to said first and second ports in an Arbitrated Loop Physical Address (AL_PA) look-up table.

18. A method according to claim 17, wherein the first and second ports recognise LISM (Loop Initialisation Select Master), LIFA (Loop Initialisation Fabric Assigned), LIPA (Loop Initialisation Previously Acquired), LIHA (Loop Initialisation Hard Assigned) and LISA (Loop Initialisation Soft Assigned) frames.

19. A method according to claim 18, wherein the first and second ports compare the AL_PA bit maps of LIFA, LIPA, LIHA and LISA frames received at the first and second ports in order to identify which AL_PAs have been assigned to devices connected to the first and second ports and pass a result of said comparison to the look-up table so that the AL_PAs of all devices connected to said first and second ports are saved in the AL_PA look-up table.

20. A method according to claim 16, wherein the first and second ports send at least some Fill words received at the first port to the second port and send at least some Fill words received at the second port to the first port, regardless of whether or not the second Fibre Channel device is sending data words to the first Fibre Channel device and regardless of whether or not the first Fibre Channel device is sending data words to the second Fibre Channel device.

21. A method according to claim 16, wherein the first and second ports send at least some ARB (Arbitrate Primitive Signal) words received at the first port to the second port and send at least some ARB words received at the second port to the first port, regardless of whether or not the second Fibre Channel device is sending data words to the first Fibre Channel device and regardless of whether or not the first Fibre Channel device is sending data words to the second Fibre Channel device.

22. A method according to claim 16, wherein when non-identical ARB (Arbitrate Primitive Signal) words are received at the first and second ports, an arbitration process between said non-identical ARB words is carried out and the winning ARB word of the arbitration process is returned to the port at which it was received.

23. A method according to claim 16, wherein at least some Primitive Sequences received at the first port are sent to the second port and at least some Primitive Sequences received at the second port are sent to the first port, regardless of whether or not the second Fibre Channel device is sending data words to the first Fibre Channel device and regardless of whether or not the first Fibre Channel device is sending data words to the second Fibre Channel device.

24. A method according to claim 16, wherein when the first Fibre Channel device wishes to send data words to the second Fibre Channel device, frame data and Start of Frame and End of Frame delimiter words received at the first port from the first Fibre Channel device are only forwarded by the first buffer to the second port when a predetermined amount of frame data has been stored in the first buffer.

25. A method according to claim 16, wherein when the second Fibre Channel device wishes to send data words to the first Fibre Channel device, frame data and Start of Frame and End of Frame delimiter words received at the second port from the second Fibre Channel device are only forwarded by the second buffer to the first port when a predetermined amount of frame data has been stored in the second buffer.

26. A method according to claim 16, wherein when the first Fibre Channel device wishes to send data words to another Fibre Channel device connected to the first port, frame data and Start of Frame and End of Frame delimiter words received at the first port from the first Fibre Channel device are returned to the first port, and when the second Fibre Channel device wishes to send data words to another Fibre Channel device connected to the second port, frame data and Start of Frame and End of Frame delimiter words received at the second port from the second Fibre Channel device are returned to the second port.

27. A method according to claim 16, wherein when the second Fibre Channel devices wishes to send data words to the first Fibre Channel device, the exact number of Non-Fill words received at the second port are forwarded to the first port.

28. A method according to claim 27, wherein if the second buffer is approaching a full state, R_RDY words received at the first port are not transmitted to the second port until the second buffer has emptied sufficiently to receive more frames from the second Fibre Channel device.

29. A method according to claim 16, wherein when the first Fibre Channel devices wishes to send data words to the second Fibre Channel device, the exact number of Non-Fill words received at the first port are forwarded to the second port.

30. A method according to claim 16, wherein when the first Fibre Channel devices wishes to send data words to another Fibre Channel device connected to the first port, Non-Fill words received at the first port from the first Fibre Channel device are returned to the first port, and, when the second Fibre Channel device wishes to send data words to another Fibre Channel device connected to the second port, Non-Fill words received at the second port from the second Fibre Channel device are returned to the second port.

* * * * *